United States Patent
Zhu et al.

(10) Patent No.: US 8,107,470 B2
(45) Date of Patent: Jan. 31, 2012

(54) APPLICATION INTERFACE FOR GLOBAL MOBILE MESSAGE DELIVERY

(75) Inventors: Tong Zhu, Fremont, CA (US); Zhaowei Charlie Jiang, Palo Alto, CA (US); Ben Kim, Sunnyvale, CA (US); Kenneth Tsz Ho, Belmont, CA (US); Jiuhe Gan, Cupertino, CA (US); Venkata Narasimha Rao Yerubandi, Sunnyvale, CA (US); Daniel John Woods, Santa Cruz, CA (US)

(73) Assignee: Yahoo! Inc., Sunnyvale, CA (US)

( * ) Notice: Subject to any disclaimer, the term of this patent is extended or adjusted under 35 U.S.C. 154(b) by 1041 days.

(21) Appl. No.: 11/981,980

(22) Filed: Oct. 31, 2007

(65) Prior Publication Data

US 2009/0109978 A1 Apr. 30, 2009

(51) Int. Cl.
*H04L 12/28* (2006.01)
*H04W 24/00* (2009.01)
*H04W 4/00* (2009.01)

(52) U.S. Cl. ............... 370/389; 370/395.52; 455/456.1; 455/466

(58) Field of Classification Search ........... 455/456–466
See application file for complete search history.

(56) References Cited

U.S. PATENT DOCUMENTS

| | | | | |
|---|---|---|---|---|
| 2001/0047294 | A1* | 11/2001 | Rothschild | 705/14 |
| 2002/0103668 | A1* | 8/2002 | Ecklund et al. | 705/1 |
| 2004/0106413 | A1* | 6/2004 | Sambin | 455/456.1 |
| 2004/0176134 | A1* | 9/2004 | Goldthwaite et al. | 455/558 |
| 2005/0186969 | A1* | 8/2005 | Lohtia | 455/456.3 |
| 2006/0089140 | A1 | 4/2006 | Zhang | 455/432.1 |
| 2006/0199597 | A1* | 9/2006 | Wright | 455/466 |
| 2006/0277271 | A1 | 12/2006 | Morse et al. | |
| 2006/0277308 | A1 | 12/2006 | Morse et al. | |
| 2007/0026879 | A1* | 2/2007 | Ala-Luukko | 455/466 |
| 2007/0136279 | A1 | 6/2007 | Zhou et al. | |
| 2007/0287477 | A1* | 12/2007 | Tran | 455/466 |
| 2008/0080523 | A1* | 4/2008 | Karacali-Akyamac et al. | 370/400 |
| 2008/0167083 | A1* | 7/2008 | Wyld et al. | 455/566 |

OTHER PUBLICATIONS

U.S. Appl. No. 11/833,173, Kim et al.
http://www.way2sms.com/content/index.html.
http://www.160by2.com/.
http://www.techpersona.com/wp/2007/05/22/sms-advertising-in-india/.
http://mobilemarketinginthenews.blogspot.com/2007/06/way2sms-starts-off-new-era-in-mobile.html.

* cited by examiner

*Primary Examiner* — Huy Vu
*Assistant Examiner* — Brandon Renner
(74) *Attorney, Agent, or Firm* — Frommer Lawrence & Haug LLP; John W. Branch

(57) ABSTRACT

A device, system, and method are directed towards communicating mobile information over a network. A mobile message (MM) is generated by an Internet Protocol (IP) enabled application interface. The MM may include advertising information. The MM is received at a routing server and comprises a destination phone number and/or advertising information. If the MM is determined to be locally processed, the routing server selectively routes the MM to a destination carrier associated with the destination phone number. If the MM is determined to be remotely processed, the MM is recursively forwarded until the MM reaches another routing server associated with the destination phone number. The other routing server is configured to selectively route the MM to the destination carrier. A response MM may be received at a boundary routing server. The response MM may be sent to the API if at least a portion of the response MM matches information associated with the MM.

2 Claims, 8 Drawing Sheets

APPLICATION INTERFACE FOR GLOBAL MOBILE MESSAGE DELIVERY

FIELD OF THE INVENTION

The present invention relates generally to routing mobile messages, and more specifically, but not exclusively to providing a common application interface to mobile message applications for message delivery across carriers and geographic regions.

BACKGROUND

Mobile devices have become a major mechanism of communication. Short Message Service (SMS) is one protocol for sending messages between users of mobile devices. Applications may also use SMS to send messages to users and/or other applications. However, mobile devices often use different carriers. And, SMS messages typically are sent over a Public Land Mobile Network (PLMN) or Public Telephone Switching Network (PTSN) via Gateway Mobile Switching Centers (GMSCs).

Sending messages between carriers often incurs extra costs and added complexity. Moreover, when users are roaming outside of their network (e.g., when traveling internationally), sending messages between carriers may also incur roaming fees. Additionally, an application developer may use a Short Message Service Center (SMSC) associated with an individual carrier to send messages to mobile devices associated with the individual carrier. It is with respect to these considerations and others that the current invention is directed.

BRIEF DESCRIPTION OF THE DRAWINGS

Non-limiting and non-exhaustive embodiments of the present invention are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings, wherein.

DETAILED DESCRIPTION OF THE INVENTION

Figure 1A:
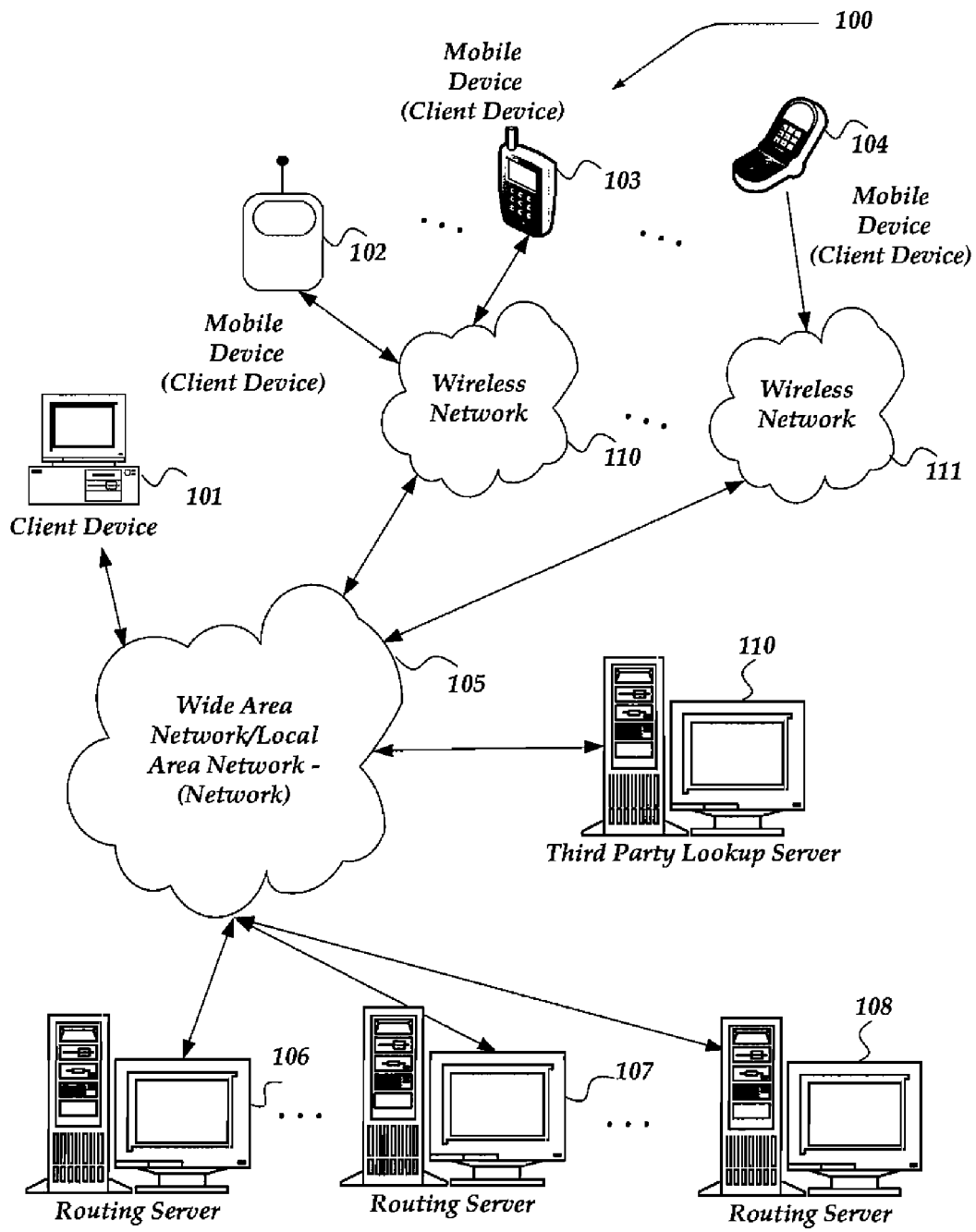
FIGS. 1A-1C are system diagrams of one embodiment of an environment in which the invention may be practiced.

The present invention now will be described more fully hereinafter with reference to the accompanying drawings, which form a part hereof, and which show, by way of illustration, specific exemplary embodiments by which the invention may be practiced. This invention may, however, be embodied in many different forms and should not be construed as limited to the embodiments set forth herein; rather, these embodiments are provided so that this disclosure will be thorough and complete, and will fully convey the scope of the invention to those skilled in the art. Among other things, the present invention may be embodied as methods or devices. Accordingly, the present invention may take the form of an entirely hardware embodiment, an entirely software embodiment or an embodiment combining software and hardware aspects. The following detailed description is, therefore, not to be taken in a limiting sense.

Throughout the specification and claims, the following terms take the meanings explicitly associated herein, unless the context clearly dictates otherwise. The phrase "in one embodiment" as used herein does not necessarily refer to the same embodiment, though it may. Furthermore, the phrase "in another embodiment" as used herein does not necessarily refer to a different embodiment, although it may. Thus, as described below, various embodiments of the invention may be readily combined, without departing from the scope or spirit of the invention.

In addition, as used herein, the term "or" is an inclusive "or" operator, and is equivalent to the term "and/or," unless the context clearly dictates otherwise. The term "based on" is not exclusive and allows for being based on additional factors not described, unless the context clearly dictates otherwise. In addition, throughout the specification, the meaning of "a," "an," and "the" include plural references. The meaning of "in" includes "in" and "on." As used herein, the terms "device input" or "user input" refer to a user input command at a device.

As used herein, the term "mobile message" refers to data configured to be displayed on a mobile device or to be sent from a mobile device. A mobile message (MM) may comprise a short message service (SMS) message, a Multimedia Messaging Service (MMS) message, or the like. As used herein, the term "transceiving" refers to transmitting (sending) and/or receiving. As used herein, the term "application interface" refers to any component for transceiving information directed to an application. In one embodiment, an interface may be an Application Programming Interface (API), a web service, a function callback, a remote procedure call, or the like.

Briefly, the present invention is directed towards communicating mobile information over a network. An MM is generated by an Internet Protocol (IP) enabled application interface. The MM is displayable on a mobile device. The MM is received at a routing server and comprises a destination phone number and/or advertising information. If the MM is determined to be locally processed, the routing server selectively routes the MM to a destination carrier associated with the destination phone number. If the MM is determined to be remotely processed, the MM is recursively forwarded until the MM reaches another routing server associated with the destination phone number. The other routing server is configured to selectively route the MM to the destination carrier. Moreover, a response MM to the originally sent MM may be received at a boundary routing server. The response MM may be sent to the API if at least a portion of the response MM matches information associated the originally sent MM.

Illustrative Operating Environment

FIG. 1A shows components of one embodiment of an environment in which the invention may be practiced. Not all the components may be required to practice the invention, and variations in the arrangement and type of the components may be made without departing from the spirit or scope of the invention. As shown, system 100 of FIG. 1A includes local area networks ("LANs")/wide area networks ("WANs")-(network) 105, wireless networks 110-111, Routing Server (RS) 106-108, third party lookup server 110, mobile devices (client devices) 102-104, and client device 101.

One embodiment of mobile devices 102-104 is described in more detail below in conjunction with FIG. 2. Generally, however, mobile devices 102-104 may include virtually any portable computing device capable of receiving and sending a message over a network, such as network 105, wireless networks 110-111, or the like. Mobile devices 102-104 may also be described generally as client devices that are configured to be portable. Thus, mobile devices 102-104 may include virtually any portable computing device capable of connecting to another computing device and receiving information. Such devices include portable devices such as, cellular telephones, smart phones, display pagers, radio frequency (RF) devices, infrared (IR) devices, Personal Digital Assistants (PDAs), handheld computers, laptop computers, wearable computers, tablet computers, integrated devices combining one or more of the preceding devices, and the like. As such, mobile devices 102-104 typically range widely in terms of capabilities and features. For example, a cell phone may have a numeric keypad and a few lines of monochrome LCD display on which only text may be displayed. In another example, a web-enabled mobile device may have a touch sensitive screen, a stylus, and several lines of color LCD display in which both text and graphics may be displayed.

A web-enabled mobile device may include a browser application that is configured to receive and to send web pages, web-based messages, and the like. The browser application may be configured to receive and display graphics, text, multimedia, and the like, employing virtually any web based language, including a wireless application protocol messages (WAP), and the like. In one embodiment, the browser application is enabled to employ Handheld Device Markup Language (HDML), Wireless Markup Language (WML), WMLScript, JavaScript, Standard Generalized Markup Language (SMGL), HyperText Markup Language (HTML), extensible Markup Language (XML), and the like, to display and send a message.

Mobile devices 102-104 also may include at least one other client application that is configured to receive content from another computing device. The client application may include a capability to provide and receive textual content, media content, and the like. The client application may further provide information that identifies itself, including a type, capability, name, and the like. In one embodiment, mobile devices 102-104 may uniquely identify themselves through any of a variety of mechanisms, including a phone number, Mobile Identification Number (MIN), an MSISDN, an electronic serial number (ESN), or other mobile device identifier. In one embodiment, the MSISDN may comprise a Country Code (CC), National Destination Code (NDC) which may identify at least one or part of a public land mobile network (PLMN), and a Subscriber Number (SN). The information may also indicate a content format that the mobile device is enabled to employ. Such information may be provided in a message, or the like, sent to RS 106-108, client device 101, or other computing devices.

Mobile devices 102-104 may also be configured to communicate a message, such as through Short Message Service (SMS), Multimedia Message Service (MMS), instant messaging (IM), internet relay chat (IRC), Mardam-Bey's IRC (mIRC), Jabber, and the like, between another computing device, such as RS 106-108, client device 101, each other, or the like. However, the present invention is not limited to these message protocols, and virtually any other message protocol may be employed. For example, the client application may enable a user to interact with the browser application, email application, VOIP applications, or the like.

Mobile devices 102-104 may further be configured to include a client application that enables the end-user to log into an end-user account that may be managed by another computing device, such as RS 106-108. Such end-user account, for example, may be configured to enable the end-user to receive emails, send/receive IM messages, SMS messages, access selected web pages, or the like.

In addition, mobile devices 102-104 may include another application that is configured to enable the mobile user to share and/or receive media content, and to display the media content. In one embodiment, each of mobile devices 102-104 may share with and/or receive the media content from RS 106-108 and/or from another one of mobile devices 102-104. For example, media content may be shared between the mobile devices using MMS, WAP, or the like. In one embodiment, a mobile device may receive a message indicating the media content is available for viewing and/or annotating at a website, or the like.

In conjunction with sharing media content, mobile devices 102-104 may enable an interaction with each other, through sharing various messages, and generally participating in a variety of integrated social experiences beyond merely voice communications. Moreover, mobile devices 102-104 may enable transceiving a message through an application interface on one of RS 106-108, wherein RS 106-109 further routes a version of the message to a mobile device associated with a destination phone number. Mobile devices 102-104 may also communicate with non-mobile client devices, such as client device 101, or the like. In one embodiment, such communications may include providing information about the shared media to a user of client device 101, or the like.

Client device 101 may include virtually any computing device capable of communicating over a network to send and receive information. One embodiment of client device 101 is described in more detail below in conjunction with FIG. 2. Generally however, the set of such devices may include devices that typically connect using a wired or wireless communications medium such as personal computers, multiprocessor systems, microprocessor-based or programmable consumer electronics, network PCs, or the like. In one embodiment, client device 101 may be configured to access a website, or other location, of shared media content, and to annotate the media content, add additional media content, or the like. Similar to mobile devices 102-104, client device 101 may be configured to allow transceiving a message through an application interface on one of RS 106-108, wherein RS 106-109 further routes a version of the message to a mobile device associated with a destination phone number. For example, client device 101 may send a mail alert message to the application interface on one of RS 106-108. RS 106-108 may maintain a session associated with client 101 (e.g., with mail alert client program on client device 101). If a response message is received from the mobile device, RS 106-108 sends the response message to client 101 (e.g., the mail alert program).

Wireless networks 110-111 are configured to couple mobile devices 102-104 and its components with network 105. Wireless networks 110-111 may include any of a variety of wireless sub-networks that may further overlay stand-alone ad-hoc networks, and the like, to provide an infrastructure-oriented connection for mobile devices 102-104. Such sub-networks may include mesh networks, Wireless LAN (WLAN) networks, cellular networks, and the like.

Wireless networks 110-111 may further include an autonomous system of terminals, gateways, routers, and the like connected by wireless radio links, and the like. These connectors may be configured to move freely and randomly and organize themselves arbitrarily, such that the topology of wireless networks 110-111 may change rapidly. In one embodiment, at least a portion of wireless networks 110-111 comprises a Public Land Mobile Network (PLMN), a Public Telephone Switching Network (PTSN), Gateway Mobile Switching Centers (GMSCs), or the like.

Wireless networks 110-111 may further employ a plurality of access technologies including 2nd (2G), 3rd (3G) generation radio access for cellular systems, WLAN, Wireless Router (WR) mesh, and the like. Access technologies such as 2G, 3G, and future access networks may enable wide area coverage for mobile devices, such as mobile devices 102-104 with various degrees of mobility. For example, wireless networks 110-111 may enable a radio connection through a radio network access such as Global System for Mobile communication (GSM), General Packet Radio Services (GPRS), Enhanced Data GSM Environment (EDGE), Wideband Code Division Multiple Access (WCDMA), and the like. In essence, wireless networks 110-111 may include virtually any wireless communication mechanism by which information may travel between mobile devices 102-104 and another computing device, network, and the like. As shown wireless network 110 provides a communication mechanism for mobile device 102-103, and wireless network 110 provides a communication mechanism for mobile device 104.

Network 105 is configured to couple RS 106-108 and its components with other computing devices, including, mobile devices 102-104, client device 101, third party lookup server 110, and through wireless networks 110-111 to mobile devices 102-104. Network 105 is enabled to employ any form of computer readable media for communicating information from one electronic device to another. Also, network 105 can include the Internet in addition to local area networks (LANs), wide area networks (WANs), direct connections, such as through a universal serial bus (USB) port, other forms of computer-readable media, or any combination thereof. On an interconnected set of LANs, including those based on differing architectures and protocols, a router acts as a link between LANs, enabling messages to be sent from one to another. Also, communication links within LANs typically include twisted wire pair or coaxial cable, while communication links between networks may utilize analog telephone lines, full or fractional dedicated digital lines including T1, T2, T3, and T4, Integrated Services Digital Networks (ISDNs), Digital Subscriber Lines (DSLs), wireless links including satellite links, or other communications links known to those skilled in the art. Furthermore, remote computers and other related electronic devices could be remotely connected to either LANs or WANs via a modem and temporary telephone link. In one embodiment, network 105 may be configured to transport information over an Internet Protocol (IP). In essence, network 105 includes any communication method by which information may travel between RS 106-108, client device 101, and other computing devices.

Additionally, communication media typically embodies computer-readable instructions, data structures, program modules, or other data in a modulated data signal such as a carrier wave, data signal, or other transport mechanism and includes any information delivery media. The terms "modulated data signal," and "carrier-wave signal" include a signal that has one or more of its characteristics set or changed in such a manner as to encode information, instructions, data, and the like, in the signal. By way of example, communication media includes wired media such as twisted pair, coaxial cable, fiber optics, wave guides, and other wired media and wireless media such as acoustic, RF, infrared, and other wireless media.

Third party lookup server 110 includes any component for looking up a telephone carrier associated with a telephone number. In one embodiment, the telephone carrier may be a wireless carrier. In one embodiment, the telephone number may be a wireless number, including a number in an MSISDN format. Third party lookup server 110 may receive the telephone number over network 105 and may send a response carrier identifier over network 105 to, for example, one of RS 106-108. In one embodiment, third party lookup server 110 may be a NetNumber™ Transactional IP Telephony Addressing & Numbering (TITAN™) server, or the like.

One embodiment of RS 106-108 is described in more detail below in conjunction with FIG. 3. Briefly, however, RS 106-108 may include any computing device capable of connecting to network 105 to enable sending and receiving a message through an application interface configured to forward the message to a destination phone number. RS 106-108 may transcode the message into a mobile message (MM), route and/or forward the MM to an appropriate carrier associated with the destination phone number over network 105. In one embodiment, each of RS 106-108 may recursively forward the MM to a different RS until it is determined that the receiving RS is to process the MM. In one embodiment, RS 106-108 may be connected in a virtual ring. That is, one RS may send the message only to another RS, until the last RS in the ring connects to the originally sending RS. However, the invention is not so limited, and any configuration, including a fully connected configuration may be used.

In one embodiment, each of RS 106-108 may be associated with and/or otherwise may be in charge of a different subset of wireless networks. For example, RS 106 may be associated with wireless network 110, and RS 107 may be associated with wireless network 111, and so forth. In one embodiment, a local gateway, aggregator, Message Service Center (MSC) and/or carrier managed by a particular RS may be associated with a particular wireless network. For example, wireless network 110 may be an ATT™ wireless network managed by RS 106, and wireless network 110 may be a Sprint™ wireless network managed by RS 106 and/or RS 107. In on embodiment, each RS may manage a plurality of wireless networks. For example, RS 106 may manage wireless networks 110-111, while the other RSs may manage other pluralities of wireless networks.

In one embodiment, a timeout may be used to determine an error state. For example, if the MM has been forwarded through RS 106-108 past a period of time, the MM may no longer be forwarded. Other error-checking mechanisms, such as detecting that the MM has not been processed by an RS, may also be used without departing from the scope of the invention. In one embodiment, RS 106-108 may employ a process similar to that described below in conjunction with FIGS. 4-6 to perform at least some of its actions. Devices that may operate as RS 106-108 include personal computers, desktop computers, multiprocessor systems, microprocessor-based or programmable consumer electronics, network PCs, servers, and the like.

Although FIG. 1A illustrates each of RS 106-108 as a single computing device, the invention is not so limited. For example, one or more functions of each of RS 106-108 may be distributed across one or more distinct computing devices. For example, sharing of media content, managing Instant Messaging (IM) sessions, SMS messages, email messages, transceiving of media content, may be performed by a plurality of computing devices, without departing from the scope or spirit of the present invention.

Figure 1B:
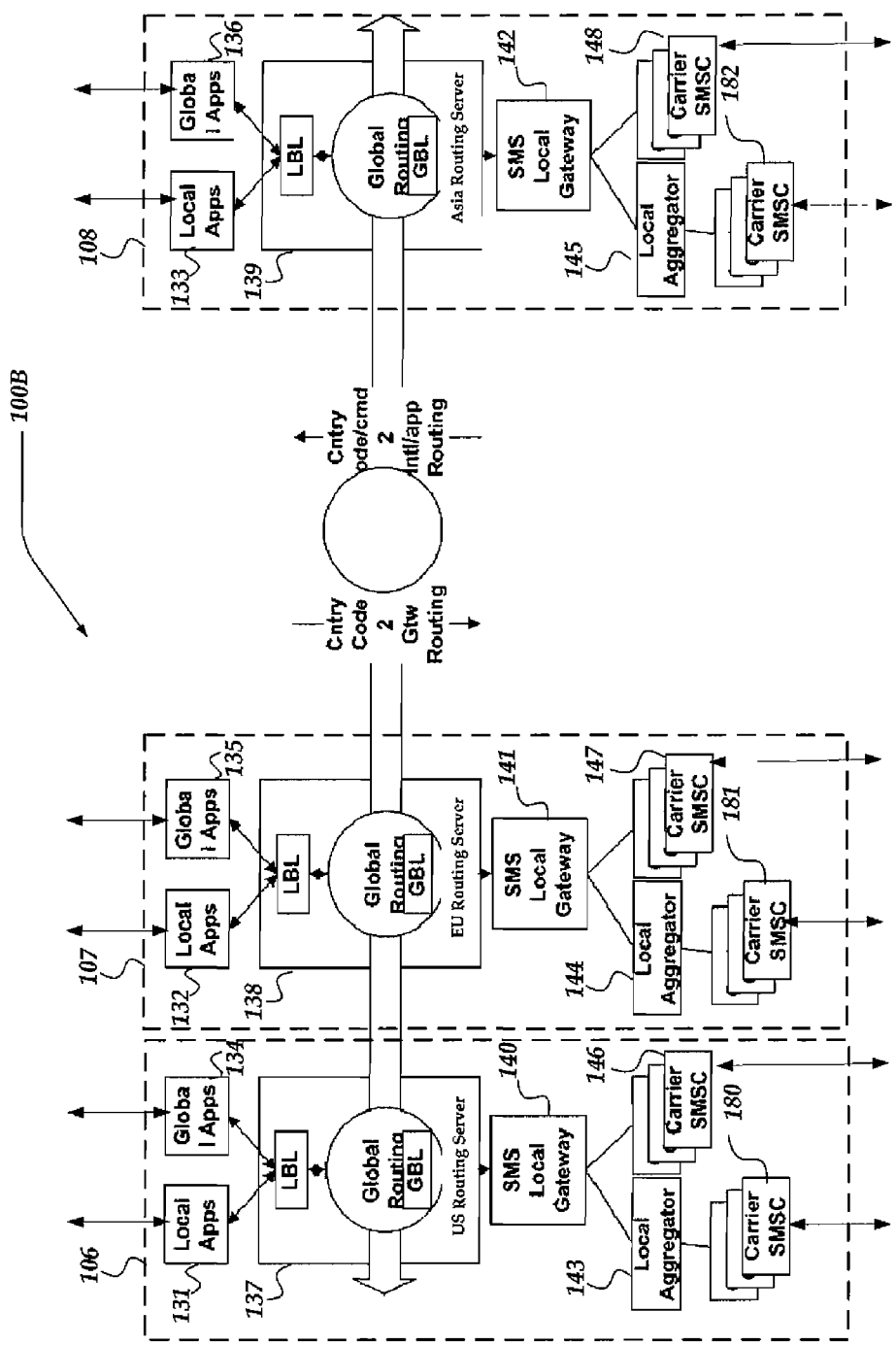

FIG. 1B shows components of an alternate embodiment of an environment in which the invention may be practiced. System 100B may include many more or less components than those shown in FIG. 1B. System 100B includes RS 106-108. RS 106-108 is in communication with each other in a ring configuration, wherein RS 106 is in communication with RS 107, RS 107 is in communication with RS 108, and RS 108 is in communication with RS 106. As shown, each of RS 106-108 comprises substantially similar components that perform substantially similar functions.

Each of RS 106-108 includes local applications 131-133, global applications 134-136, business and routing logic modules (BRLM) 137-139, SMS gateways 140-142, local aggregators 143-145, carrier Short Message Service Centers (SMSCs) 146-148, and carrier SMSCs 180-182. Local application 131 and global application 134 are in communication with BRLM 137. BRLM 137 is in communication with SMS local gateway 140. SMS local gateway 140 is in communication with local aggregator 143 and carrier SMSC 146, and local aggregator 143 is in communication with carrier SMSC 180. Although SMS local gateway 140 is shown as a single component, there may be a plurality of local gateways. In one embodiment, there may be a local gateway for each country and/or state located within a geographic region associated with the RS. Each of RS 107-108 also includes components communicating similarly to the components of RS 106. Also, while an SMS and SMSC are shown, other messaging services such as a Multimedia Message Service (MMS) and a Multimedia Message Service Center (MMSC) may be used without departing from the scope of the invention. In one embodiment, components of RS 106-108 perform the operations of processes 400-600 of FIGS. 4-6.

Briefly, local application 131 may receive a message from an application running on RS 106 over an IP protocol, an OSI application level protocol, or the like. Similarly, global application 134 may receive a message from a remote application over a network (e.g., an email application, a web service, or the like). The message is sent to BRLM 137. The message may be received at an interface. The interface may convert the message into a mobile message (MM). In one embodiment, BRLM 137 may determine if the MM is to be locally or remotely processed. If the MM is to be remotely processed, the MM is forwarded to RS 107 and/or RS 108 until the MM reaches an RS configured to process the MM. If the MM is to be locally processed, a destination carrier for the MM is determined. It may also be determined whether to send the MM to the local aggregator 143 or directly to a carrier SMSC 146. The MM is selectively routed appropriately based on this determination and sent to the destination carrier. The destination carrier then sends the MM to a mobile device (e.g., one of mobile devices 101-104).

Figure 1C:
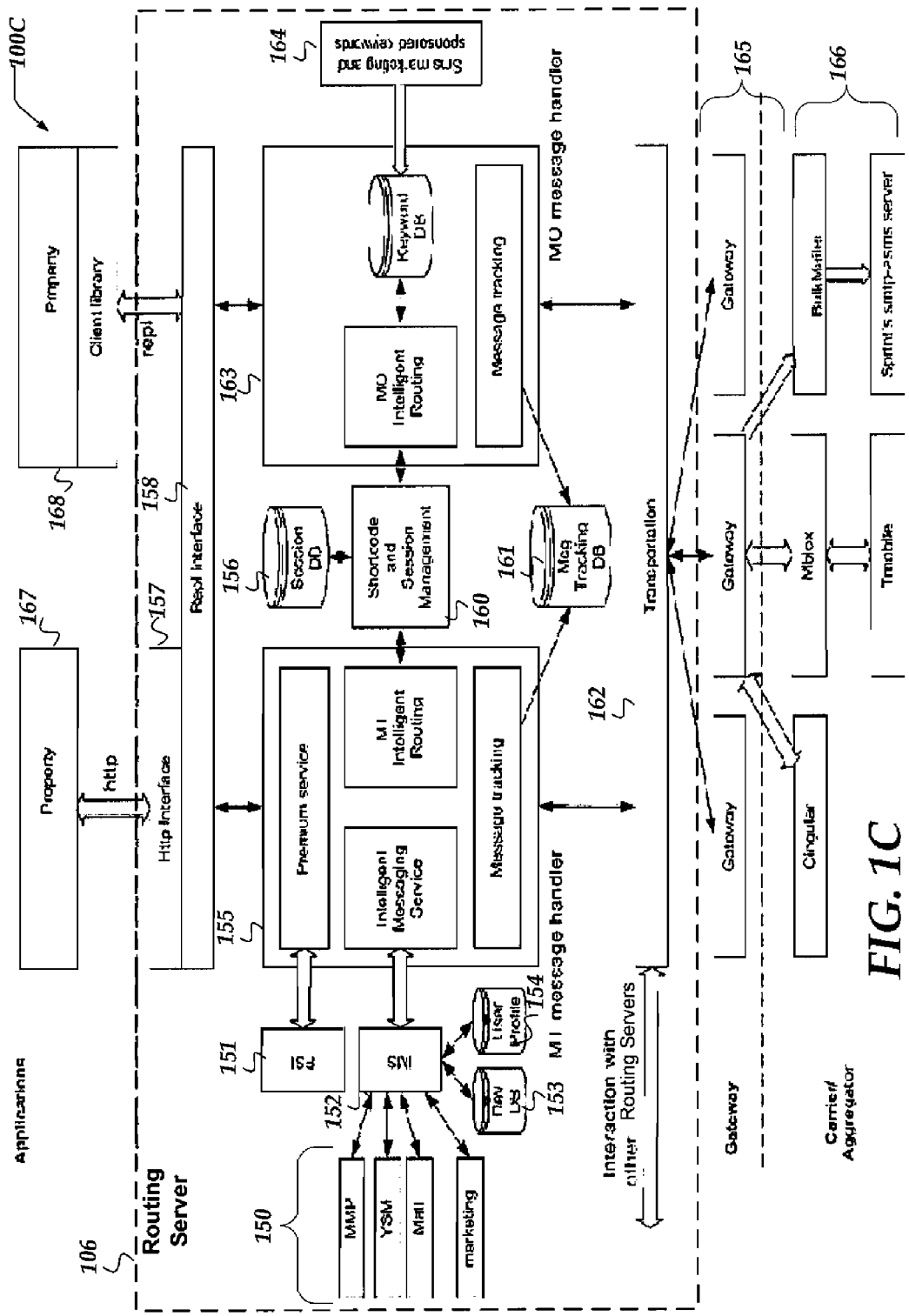

FIG. 1C shows components of an alternate embodiment of an environment in which the invention may be practiced. System 100C may include many more or less components than those shown in FIG. 1C. In one embodiment, components of system 100C perform the operations of processes 400-600 of FIGS. 4-6.

System 100C includes RS 106, properties 167-168, gateways 165, and carrier and/or aggregator components 166. Property 168 includes a client library (e.g., application program). RS 106 includes HTTP interface 157, replication interface 158, local applications 150, PSI 151, MS 152, development database 153, user profile database 154, intelligent messaging component 155, session database 156, short-code and session management component 160, intelligent routing component 163, SMS marketing and sponsored keywords storage 164, message tracking database 161, and transportation layer 162.

HTTP interface 157 is in communication with property 167 (global application). Replication interface 158 is in communication with property 168 (global application). Local applications 150 (MMP, YSM, Mail, Marketing) are in communication with the application interfaces, PSI 151 and MS 152. These application interfaces are in communication with development database 153 and user profile database 154. HTTP interface 157, replication interface 158, PSI 151 and MS 152 are in communication with intelligent messaging component 155. HTTP interface 157 and replication interface 158 are also in communication with intelligent routing component 163. Intelligent messaging component 155 is in communication with short-code and session management component 160, which is in communication with session database 156, and with intelligent routing component 163. Both intelligent messaging component 155 and intelligent routing component 163 are in communication with message tracking database 161 and with transportation layer 162. SMS marketing and sponsored keywords storage 164 is in communication with intelligent routing component 163. Transportation layer 162 is in communication with other routing servers (e.g., over an IP network) and gateways 165. Gateways 165 are in communication with carrier and/or aggregator components 166.

Briefly, a message is received by a local application (e.g., PSI 151 and/or MS 152) and/or a global application (e.g., properties 167-168). The message is converted into an MM by an interface (e.g., HTTP interface 157 and/or replication interface 158). Intelligent messaging component 155, which includes a premium service, intelligent message service, MT intelligent routing and message tracking, may determine to process the message locally and/or to send the message to a remote RS for processing. Intelligent messaging component 155 may store the message in message tracking database 161 and/or store a session mapping using short-code and session management 160 and/or session database 156. In one embodiment, at least a portion of a sender phone number of the MM may be a short-code and/or extension (e.g, 9999 (short-code) and 001 (extension)). The portion may be stored using short-code and session management 160 and/or session database 156.

If the MM is to be routed, the MM is sent to intelligent routing component 163, which includes an MO intelligent routing, a keyword database, and a message tracking component. The intelligent routing component 163 may determine that the routed MM may include a sponsored keyword, or the like, using sponsored keywords storage 164 and may store an indication of a use of the keyword in message tracking database 161 for further monetization, or the like. Intelligent routing component 163 may then recursively route the MM to another RS using transportation component 162. The other RS may operate substantially similarly to RS 106.

If the MM is to be processed locally, the MM is sent using transportation component 162 to one of gateways 165 for further processing. As shown, carrier and/or aggregator components 166 include a plurality of carriers, including Cingular™, T-Mobile™, and Sprint™. Components 166 may also aggregate messages before sending them, such as with a bulk mailer, mailbox, or the like. In one embodiment, each of gateways 165 may be associated with a country or state, and each of gateways 165 may communicate with its own set of components 166. In one embodiment, the MM is sent from at least one of gateways 165 to the appropriate one of components 164 associated with a destination phone number of the MM.

Illustrative Client Environment

Figure 2:
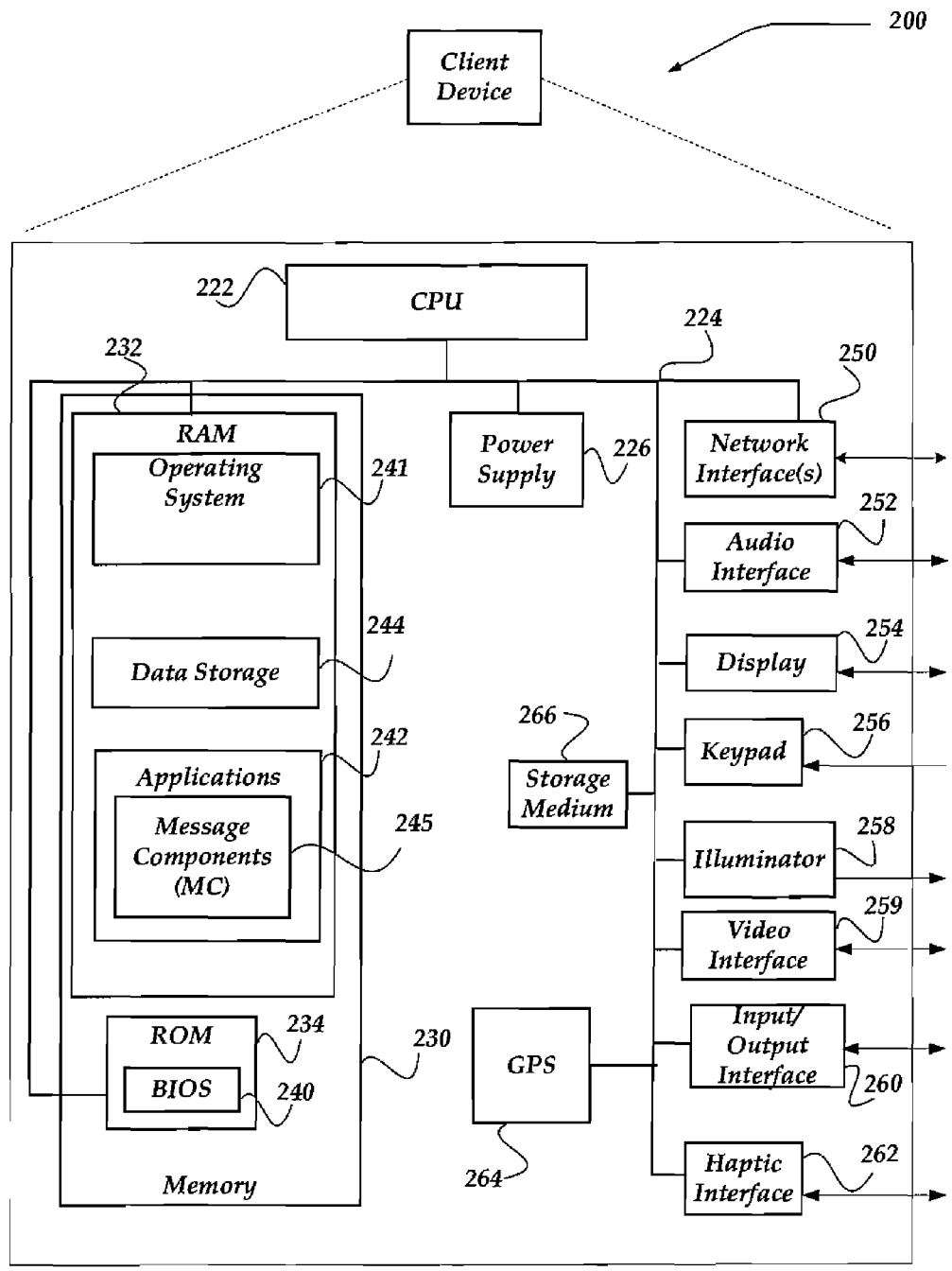
FIG. 2 shows one embodiment of a mobile device that may be included in a system implementing the invention.

FIG. 2 shows one embodiment of client device 200 that may be included in a system implementing the invention. Client device 200 may include many more or less components than those shown in FIG. 2. However, the components shown are sufficient to disclose an illustrative embodiment for practicing the present invention. Client device 200 may represent, for example, mobile devices 102-104 of FIG. 1A.

As shown in the figure, client device 200 includes a processing unit (CPU) 222 in communication with a mass memory 230 via a bus 224. Client device 200 also includes a power supply 226, one or more network interfaces 250, an audio interface 252, video interface 259, a display 254, a keypad 256, an illuminator 258, an input/output interface 260, a haptic interface 262, and an optional global positioning system (GPS) receiver 264. Power supply 226 provides power to mobile device 200. A rechargeable or non-rechargeable battery may be used to provide power. The power may also be provided by an external power source, such as an AC adapter or a powered docking cradle that supplements and/or recharges a battery.

Client device 200 may optionally communicate with a base station (not shown), or directly with another computing device. Network interface 250 includes circuitry for coupling client device 200 to one or more networks, and is constructed for use with one or more communication protocols and technologies including, but not limited to, global system for mobile communication (GSM), code division multiple access (CDMA), time division multiple access (TDMA), user datagram protocol (UDP), transmission control protocol/Internet protocol (TCP/IP), SMS, general packet radio service (GPRS), WAP, ultra wide band (UWB), IEEE 802.16 Worldwide Interoperability for Microwave Access (WiMax), SIP/RTP, or any of a variety of other wireless communication protocols. Network interface 250 is sometimes known as a transceiver, transceiving device, or network interface card (NIC).

Audio interface 252 is arranged to produce and receive audio signals such as the sound of a human voice. For example, audio interface 252 may be coupled to a speaker and microphone (not shown) to enable telecommunication with others and/or generate an audio acknowledgement for some action. Display 254 may be a liquid crystal display (LCD), gas plasma, light emitting diode (LED), or any other type of display used with a computing device. Display 254 may also include a touch sensitive screen arranged to receive input from an object such as a stylus or a digit from a human hand.

Video interface 259 is arranged to capture video images, such as a still photo, a video segment, an infrared video, or the like. For example, video interface 259 may be coupled to a digital video camera, a web-camera, or the like. Video interface 259 may comprise a lens, an image sensor, and other electronics. Image sensors may include a complementary metal-oxide-semiconductor (CMOS) integrated circuit, charge-coupled device (CCD), or any other integrated circuit for sensing light.

Keypad 256 may comprise any input device arranged to receive input from a user. For example, keypad 256 may include a push button numeric dial, or a keyboard. Keypad 256 may also include command buttons that are associated with selecting and sending images. Illuminator 258 may provide a status indication and/or provide light. Illuminator 258 may remain active for specific periods of time or in response to events. For example, when illuminator 258 is active, it may backlight the buttons on keypad 256 and stay on while the client device is powered. Also, illuminator 258 may backlight these buttons in various patterns when particular actions are performed, such as dialing another client device. Illuminator 258 may also cause light sources positioned within a transparent or translucent case of the client device to illuminate in response to actions.

Client device 200 also comprises input/output interface 260 for communicating with external devices, such as a headset, or other input or output devices not shown in FIG. 2. Input/output interface 260 can utilize one or more communication technologies, such as USB, infrared, Bluetooth™, or the like. Haptic interface 262 is arranged to provide tactile feedback to a user of the client device. For example, the haptic interface may be employed to vibrate client device 200 in a particular way when another user of a computing device is calling.

Optional GPS transceiver 264 can determine the physical coordinates of client device 200 on the surface of the Earth, which typically outputs a location as latitude and longitude values. GPS transceiver 264 can also employ other geo-positioning mechanisms, including, but not limited to, triangulation, assisted GPS (AGPS), E-OTD, CI, SAI, ETA, BSS or the like, to further determine the physical location of client device 200 on the surface of the Earth. It is understood that under different conditions, GPS transceiver 264 can determine a physical location within millimeters for mobile device 200; and in other cases, the determined physical location may be less precise, such as within a meter or significantly greater distances. In one embodiment, however, mobile device may through other components, provide other information that may be employed to determine a physical location of the device, including for example, a MAC address, IP address, or the like.

Mass memory 230 includes a RAM 232, a ROM 234, and other storage means. Mass memory 230 illustrates another example of computer storage media for storage of information such as computer readable instructions, data structures, program modules or other data. Mass memory 230 stores a basic input/output system ("BIOS") 240 for controlling low-level operation of mobile device 200. The mass memory also stores an operating system 241 for controlling the operation of mobile device 200. It will be appreciated that this component may include a general purpose operating system such as a version of UNIX, or LINUX™, or a specialized client communication operating system such as Windows Mobile™, or the Symbian® operating system. The operating system may include, or interface with a Java virtual machine module that enables control of hardware components and/or operating system operations via Java application programs.

Memory 230 further includes one or more data storage 244, which can be utilized by client device 200 to store, among other things, applications 242 and/or other data. For example, data storage 244 may also be employed to store information that describes various capabilities of mobile device 200. The information may then be provided to another device, including being sent as part of a header during a communication, sent upon request, or the like. Moreover, data storage 244 may also be employed to store media content and/or social networking information including text messages, address books, group member lists, or the like. At least a portion of the media content may also be stored on storage medium 266, such as a disk drive, removable storage, or the like within mobile device 200.

Applications 242 may include computer executable instructions which, when executed by mobile device 200, provide such functions as calendars, contact managers, task managers, transcoders, database programs, word processing programs, screen savers, security applications, spreadsheet programs, games, search programs, and so forth. Applications 242 may further include Message Components (MC) 245.

MC 245 represents any of a variety of applications configured to transmit, receive, and/or otherwise process messages and other network content, including, but not limited to SMS, MMS, IM, email, VOIP, browsers, or the like, and to enable telecommunication with another user of another networked device. For example, MC 245 may include any of a variety of browser applications, which may be run under control of operating system 241 to enable and manage requesting, receiving, and rendering markup pages such as WAP pages (sometimes referred to as WAP cards), SMGL, HTML, HDML, WML, WMLScript, JavaScript, and the like.

MC 245 may further include an IM application that is configured to initiate and otherwise manage an instant messaging session, including, but not limited to AOL Instant Messenger, Yahoo! Messenger, .NET Messenger Server, ICQ, and the like. In one embodiment, the IM application within MC 245 may be configured to employ a SIP/RTP to integrate IM/VOIP features. For example, the IM application may employ SIMPLE (SIP for Instant Messaging and Presence Leverage), APEX (Application Exchange), Prim (Presence and Instant Messaging Protocol), Open XML-based XMPP (Extensible Messaging and Presence Protocol), more commonly known as Jabber and OMA (Open Mobile Alliance)'s IMPS (Instant Messaging and Presence Service) created specifically for mobile devices, or the like.

MC 245 may also include text messaging application(s) that enables client device 200 to receive and/or send text messages to another device. In one embodiment, the text messaging application(s) may also provide an alerting mechanism that indicates to a user of client device 200 when a text message is received. The text messaging application(s) may also allow the user to compose a text response message, and to send the text response message over a network. The text messaging application(s) may operate to manage SMS text messages, MMS messages, Enhanced Message Service (EMS) messages, or the like, where graphics, video clips, sound files, or other media content may be communicated between client device 200 and another networked device.

In any event, any one or more of the messaging applications within MC 245 may be employed to enable a user of client device 200 to communicate with an Internet Protocol (IP) enabled application interface over network interfaces 250. In one embodiment, MC 245 and/or a type of message generated by MC 245 may be associated with the (IP enabled) application interface. In one embodiment, the application interface may be a web interface, an email interface, or the like.

Illustrative Server Environment

Figure 3:
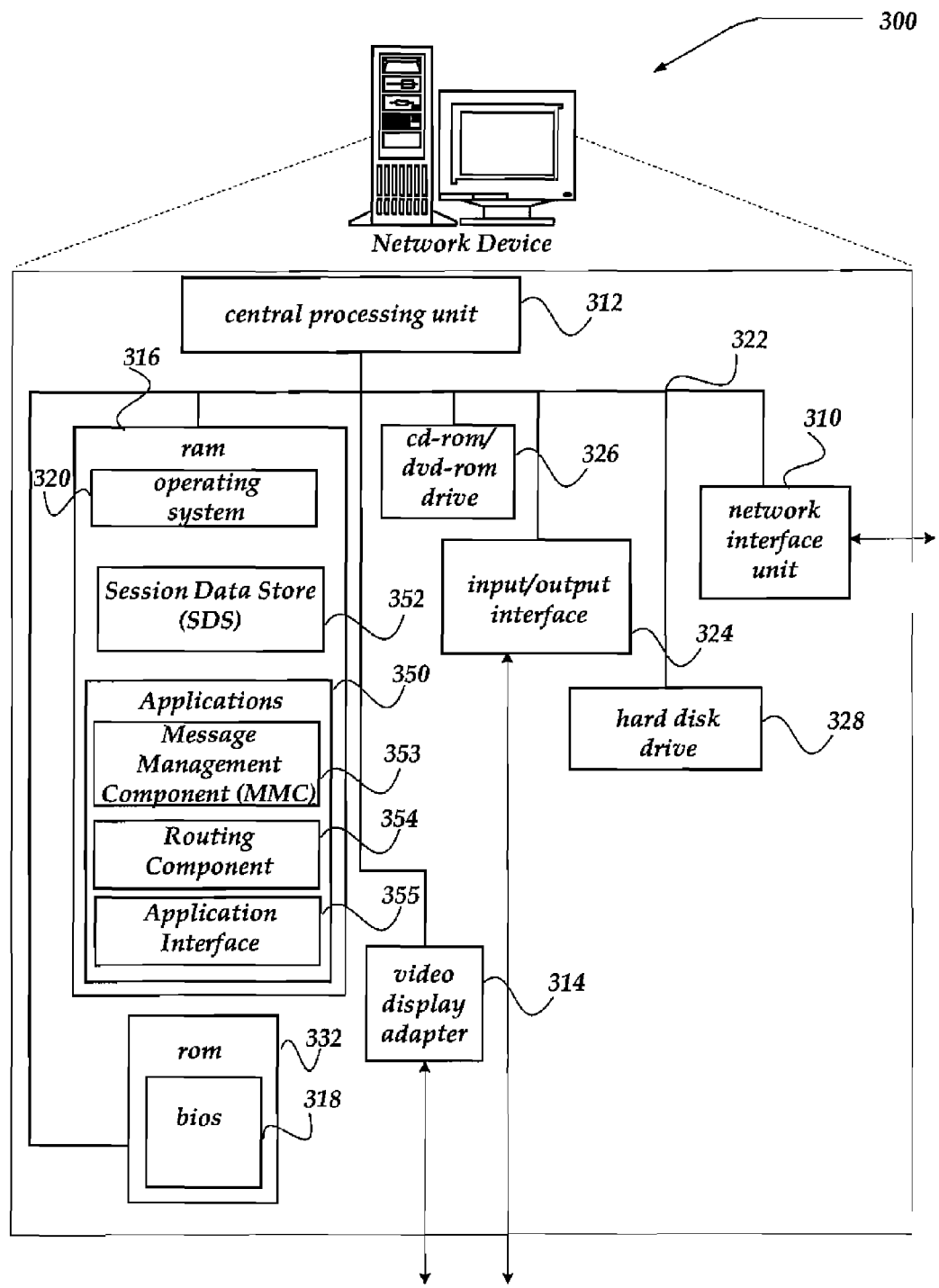
FIG. 3 shows one embodiment of a network device that may be included in a system implementing the invention.

FIG. 3 shows one embodiment of a network device, according to one embodiment of the invention. Network device 300 may include many more components than those shown. The components shown, however, are sufficient to disclose an illustrative embodiment for practicing the invention. Network device 300 may represent, for example, RS 106-108 of FIGS. 1A-1C.

Network device 300 includes processing unit 312, video display adapter 314, and a mass memory, all in communication with each other via bus 322. The mass memory generally includes RAM 316, ROM 332, and one or more permanent mass storage devices, such as hard disk drive 328, tape drive, optical drive, and/or floppy disk drive. The mass memory stores operating system 320 for controlling the operation of network device 300. Any general-purpose operating system may be employed. Basic input/output system ("BIOS") 318 is also provided for controlling the low-level operation of network device 300. As illustrated in FIG. 3, network device 300 also can communicate with the Internet, or some other communications network, via network interface unit 310, which is constructed for use with various communication protocols including the TCP/IP protocol. Network interface unit 310 is sometimes known as a transceiver, transceiving device, or network interface card (NIC).

The mass memory as described above illustrates another type of computer-readable media, namely computer storage media. Computer storage media may include volatile, nonvolatile, removable, and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by a computing device.

The mass memory also stores program code and data. One or more applications 350 are loaded into mass memory and run on operating system 320. Examples of application programs may include transcoders, schedulers, calendars, database programs, word processing programs, HTTP programs (including XmlHTTPRequest (XHR), Asynchronous JavaScript and XML (AJAX), or JavaScript Object Notation (JSON) programs), customizable user interface programs, IPSec applications, encryption programs, security programs, account management, and so forth.

Session Data Store (SDS) 352 includes any component for storing a plurality of associations between at least a portion of a source phone number, a destination phone number, an identity of a routing server and/or an application identifier or type associated with application interface 355. In one embodiment, the associations may be session mappings. The session mappings may map at least a short-code and/or extension number with the application interface 355.

Application interface 355 includes any component for transceiving a message. In one embodiment, application interface 355 may transmit a message from a local application, such as an email application, a global application, such as through a web service interface (e.g., AJAX interface), over network interface 310, or the like. Application interface 355 may transcode the message to and/or from a mobile message type (e.g., into an MM). In one embodiment, application interface 355 may also receive an MM. The MM may be in response to another MM previously sent through application interface 355. The received MM may be transcoded and sent to an application for further processing. For example, the received MM may be a request for an email in response to an email alert MM.

Message management component 353 includes any component for transceiving an MM from application interface 355. Message management component 353 may perform operation of processes 400-600 of FIGS. 4-6. For example, message management component 353 may determine to process the MM locally. If the MM is to be processed locally, message management component 353 may create a session mapping using SDS 352. The MM may further send the MM to a local aggregator and/or the destination carrier through a Message Service Center (MSC), over network interface unit 310. If the MM is to be processed globally, the MM is sent to routing component 354.

Routing component 354 includes any component for recursively routing an MM over network interface unit 310, to another routing server. In one embodiment, the other routing server operates substantially similarly to network device 300. In one embodiment, routing component 354 may determine a destination carrier based on information cached in RAM 316 and/or hard disk 328 and/or information received from a third party lookup service over network interface 310. Routing component 354 may perform operation of processes 400-600 of FIGS. 4-6. For example, routing component 354 may determine the appropriate routing server to process the MM based on a mapping of a country code portion of the MM and the appropriate routing server.

Generalized Operation

Figure 4:
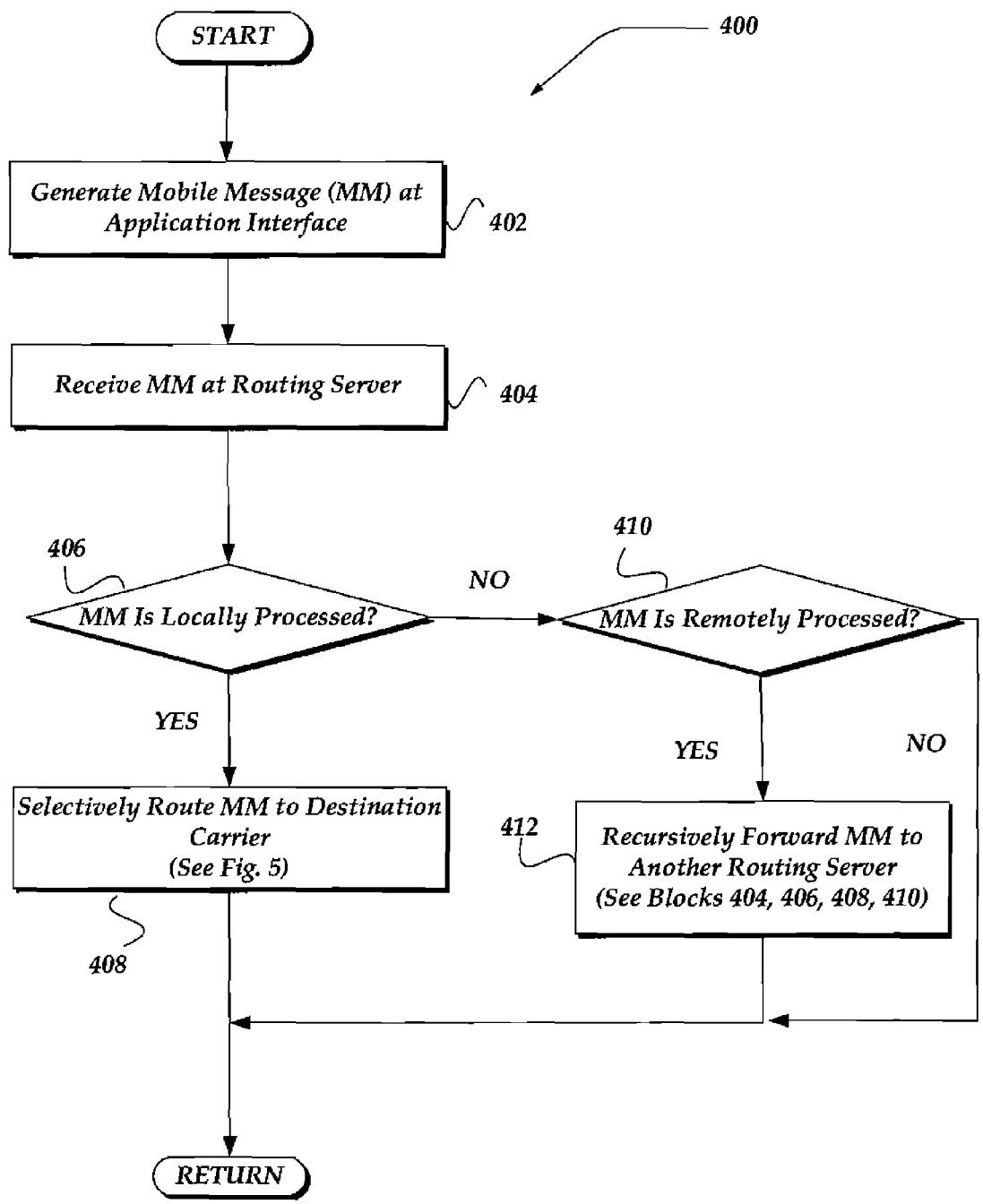
FIG. 4 illustrates a logical flow diagram generally showing one embodiment of a process for sending a mobile message over an application interface.
Figure 5:
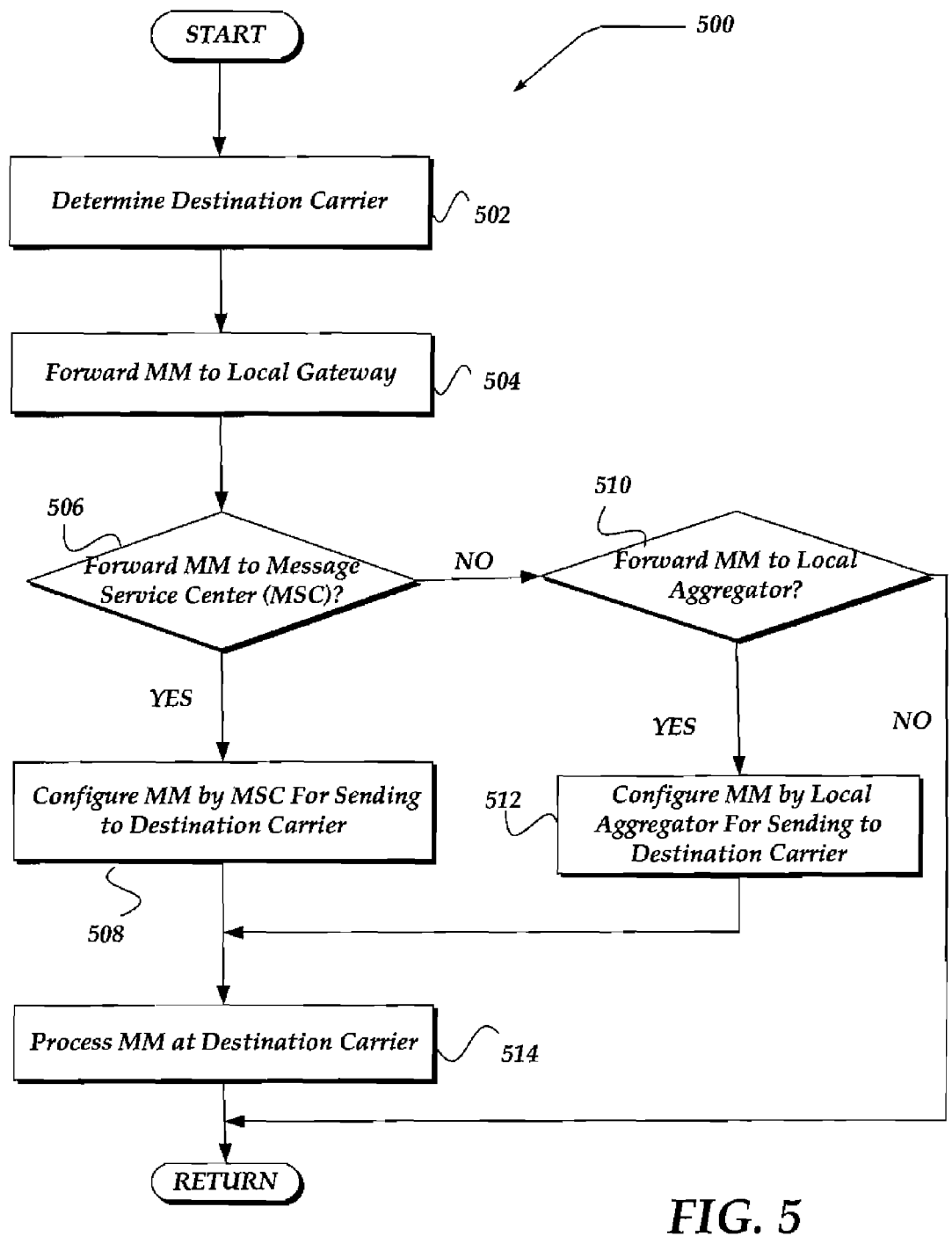
FIG. 5 illustrates a logical flow diagram generally showing one embodiment of a process for selectively routing a mobile message.
Figure 6:
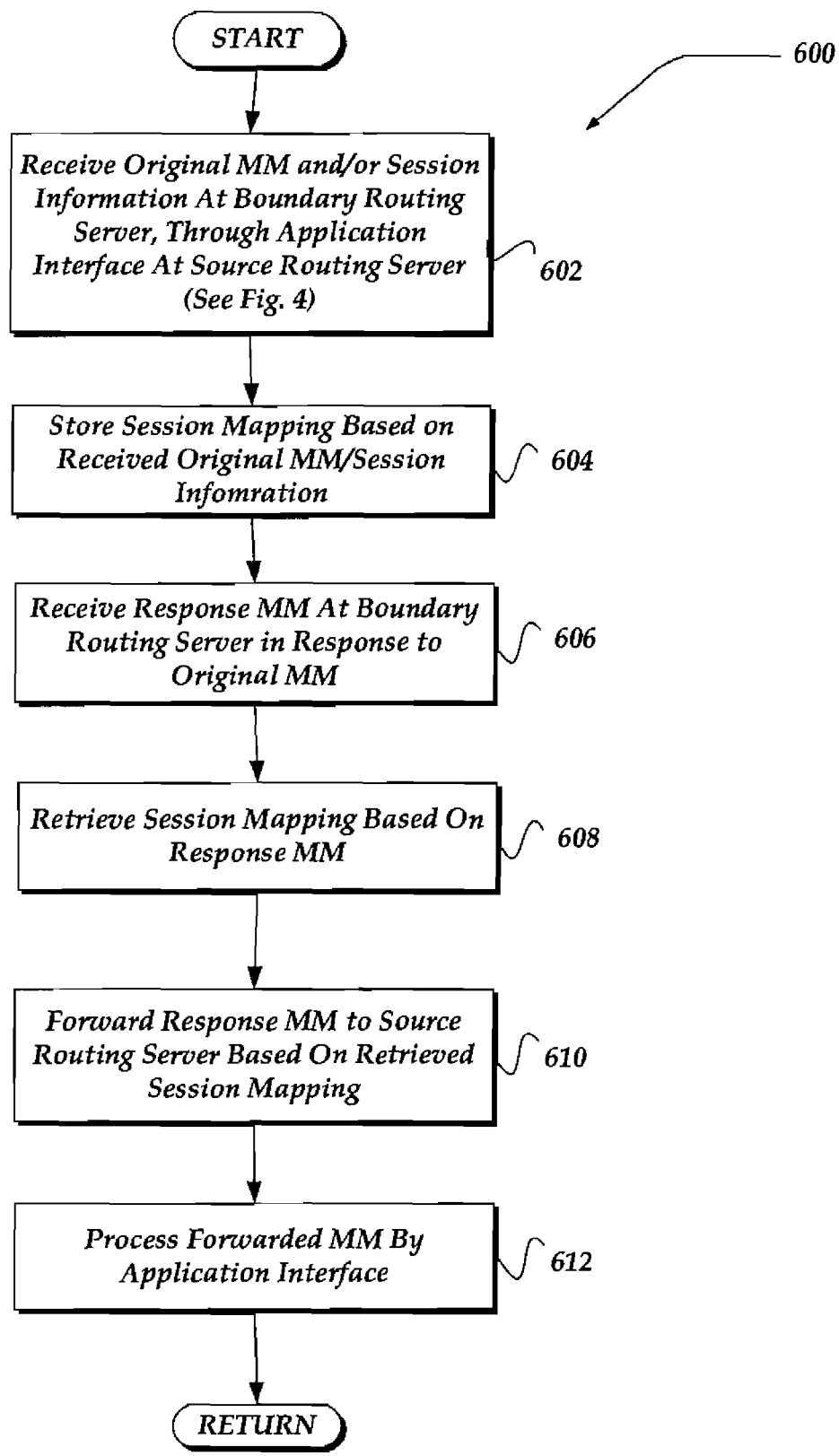
FIG. 6 illustrates a logical flow diagram generally showing one embodiment of a process for receiving a mobile message over an application interface, in accordance with the present invention.

The operation of certain aspects of the invention will now be described with respect to FIGS. 4-6. FIGS. 4-6 provide logical flow diagrams of certain aspects of the present invention. The processes of FIGS. 4-6 may be implemented, for example, within RS 106-108 of FIG. 1A, and/or components of FIGS. 1B-1C.

FIG. 4 illustrates a logical flow diagram generally showing one embodiment of a process for sending a mobile message over an application interface. Process 400 begins at block 402 where a mobile message (MM) may be generated by the application interface. In one embodiment, the application interface is configured to receive information over Hyper Text Transfer Protocol (HTTP) (e.g., using a web services component), a Simple Mail Transfer Protocol (SMTP), or any other Open Systems Interconnection (OSI) application level protocol. In one embodiment, the MM comprises a Short Message Service (SMS) message, a Multimedia Message Service (MMS) message, or the like. The application interface may transcode the received information between a type associated with an application and a mobile message (MM) type. The received information may be received over a network, from a client device, a client application (program), or the like. In one embodiment, the network may be configured to process an Internet Protocol (IP). The client device and/or client program may be associated with the application interface, connected to the application interface via a session, or the like.

The MM may be generated based on the received information. In one embodiment, the MM includes a message body and/or advertising information. For example, the advertising information may be appended to the MM if a difference between a threshold and a length of a message body of the MM is sufficient to add the advertising information. Likewise, the length of the advertising information may be determined based upon the length of the message body. For example, if the threshold is 160 characters and the message body is 100 characters, 60 characters of advertising information may be included. However, if the threshold is 160 characters but the message body is 145 characters, 15 characters of advertising information maybe included. In one embodiment, the threshold is based upon a defined maximum length for a SMS message. This length may be defined, for example, by the carrier or by a geographical region associated with the client device. The defined length may be different for each carrier and/or geographical region.

In one embodiment, the advertising information includes both a selectable resource identifier and an advertisement descriptor. However, in other embodiments, a selectable resource identifier may be provided without an advertisement descriptor, an advertisement descriptor may be provided without a selectable resource identifier, and/or the like.

The advertisement descriptor may be any content that is an advertisement, describes an advertisement, is a slogan, is a phrase, and/or the like. The advertisement descriptor may also be based upon the content of the message body and may be obtained from a specialized data source or from an individual data source. Likewise, the advertisement descriptor may also be based on a user's current location, a current application running on the mobile device, the mobile device profile data, online profile data that is associated with the mobile device, for preferences, behaviors, past purchases, social networking relationships, and/or other user-specific data. Other examples of information upon which the generation of the advertisement descriptor ay be based include:

- tracked behavior of a user (e.g. purchase history, number of searches)
- user-specific data (e.g. demographic data such as gender)
- time of day at the time of query
- time zone of the user
- search query characteristics (e.g. language, length of query, media type)
- data plan of the device or user
- device capabilities or characteristics (e.g. screen size)
- user expressed preferences
- proximity (e.g. to other devices or other users)
- direction of the device (e.g. device is facing north)
- movement of the device (e.g. device is going north, device is moving at 10 mph)
- tracked behavior or other context of users related to user initiating search;
- social network (e.g. user A's friends search for sports, so sports are more relevant for user A)
- network characteristics (e.g. speed)
- content owned by the user or on a device used by the user, which can be, but does not have to be the same as the mobile device (e.g. user has a document on their PC relevant to a search done on the mobile device).

Similarly, the server may employ aggregated data from click stream analyses and/or other statistical analyses to generate the advertisement descriptor.

The selectable resource identifier may be included to enable the user to respond to and/or interact with the advertisement descriptor. For example, the selectable resource identifier may include a short-code, a telephone number, an IP address, a Uniform Resource Locator (URL), a shortened-URL that encodes a full URL, a user identifier, or the like.

Processing then continues to block 404.

At block 404, the MM is received at a routing server located within a geographic region. In one embodiment, the MM is received over the network. In one embodiment, the geographic region of the routing server may be determined (e.g., predefined, by GPS, by an IP address of the routing server, or the like). The MM may comprise a destination phone number, sender phone number, message body, or the like. In one embodiment, the routing server may be configured to include advertising information into the MM. In one embodiment, the phone number may be in an MSISDN format. The MM may be configured to be displayed on the mobile device. Processing then continues to decision block 406.

At decision block 406, it is determined whether the MM is to be locally processed in the geographic region. In one embodiment, the determination comprises determining if the MM can be delivered through a local gateway. In one embodiment, the destination phone number is parsed for a country code. In one embodiment, the destination phone number may be an MSISDN. In one embodiment, the country code may be the Country Code (CC) and/or National Destination Code (NDC) portion of the MSISDN. In one embodiment, if the country code is included in a plurality of country codes associated with the routing server and/or the geographic region associated with the routing server, the MM is to be locally processed. If the MM is to be locally processed in the geographic region, processing continues to block 408. Otherwise, processing continues to decision block 410.

At block 408, the routing server selectively routes the MM to a destination carrier associated with the destination phone number. Selective routing may be performed by process 500 of FIG. 5. Processing then returns to a calling process for further processing.

At decision block 410, it is determined whether the MM is to be remotely processed. In one embodiment, the determination comprises determining if the MM can be delivered through another (remote) gateway. In one embodiment, the destination phone number is parsed for a country code. In one embodiment, if it is determined that the country code is included in a plurality of country codes associated with the other routing server and/or the other geographic region associated with the other routing server, then the MM is to be remotely processed. If the MM is to be remotely processed, processing continues to block 412. Otherwise, processing returns to a calling process for further processing.

At decision block 412, the MM is recursively forwarded over the network until the MM reaches another routing server geographically located within another region associated with the destination phone number. In one embodiment, the other routing server may be configured to include advertising information into the MM. In one embodiment, recursive forwarding comprises performing blocks 404, 406, 408, and 410 for each of routing servers to which the MM is forwarded. Processing then continues to a calling process for further processing.

FIG. 5 illustrates a logical flow diagram generally showing one embodiment of a process for selectively routing a mobile message. Process 500 begins at block 502, where a destination carrier is determined. In one embodiment, the destination carrier may be determined based on a cached association relating the destination carrier and the destination phone number. In one embodiment, the destination carrier is determined based on a Subscriber Number (SN) portion of the destination phone number. If the association is not cached, the association is received from a third-party lookup server. The received association may be cached for later retrieval. Processing then continues to block 504.

At block 504, the MM is forwarded to a local gateway associated with a country code portion of the destination phone number. In one embodiment, the local gateway may be located in geographic proximity to a country associated with the country code portion. In one embodiment, the identity of the carrier may also be forwarded to the local gateway. In one embodiment, block 502 may be optional and may not be performed. Processing then continues to block 506.

At decision block 506, it is determined whether to forward the MM to a Message Service Center (MSC). In one embodiment, this determination is performed by a local gateway and/or sent to the local gateway. In one embodiment, if a Quality of Service (QoS) within a time-window of a network connection between the routing server and the MSC is above a threshold, processing continues to block 508. For example, if an inverse of a congestion measure (e.g., number of dropped SMS messages) of the network connection is above a threshold, processing continues to block 508. Otherwise, processing continues to decision block 510.

At block 508, the MM is forwarded to the MSC and configured by the MSC for sending to the destination carrier. In one embodiment, the MM is converted/transcoded from an MM type to another MM type associated with the destination carrier, before being sent to the MSC. In one embodiment, the MM types comprise at least one of a Simple Network Paging Protocol (SNPP), a Computer Application interface to Message Distribution (CIMD) protocol, or the like. In one embodiment, the MSC is configured to directly connect to the destination carrier. In one embodiment, the determined destination carrier may be associated with the MSC. In one embodiment, the MSC comprises a Short Message Service Center (SMSC), a Multimedia Message Service Center (MMSC), or the like. Processing then continues to block 514.

At decision block 510, it is determined whether to forward the MM to a local aggregator. In one embodiment, if the QoS is not above the threshold, processing continues to block 512.

At block 512, the MM is routed to a local aggregator and configured by the local aggregator for sending to the destination carrier. In one embodiment, the MM is converted/transcoded from an MM type to another MM type associated with the destination carrier, before being sent to the local aggregator. In another embodiment, the local aggregator may perform the conversion/transcoding. In one embodiment, the local aggregator is configured to forward the MM to a plurality of carriers. In one embodiment, the determined destination carrier may be received by the local aggregator. The local aggregator may then forward the MM to the destination carrier. Processing then continues to block 514.

At block 514, the destination carrier receives the MM and processes the MM. In one embodiment, the destination may receive the MM over a Public Land Mobile Network (PLMN) or Public Telephone Switching Network (PTSN) via Gateway Mobile Switching Centers (GMSCs), or other non-IP enabled network, or the like. The destination carrier may send the MM to the mobile device. Processing then continues to a calling process for further processing.

FIG. 6 illustrates a logical flow diagram generally showing one embodiment of a process for receiving a mobile message over an application interface. Process 600 of FIG. 6 begins at block 602 where a mobile message and/or session information are received at a boundary routing server and through an application interface at a source routing server. In one embodiment, the session information may be included within the MM. Block 602 may be performed by process 400 of FIG. 4. Briefly, the MM/session information is received over an application interface at the source routing server, and the source routing server either locally processes the MM/session information or recursively forwards the MM/session information to another routing server for substantially similar processing. The routing server sending the MM to a carrier (either the source routing server of the other routing server) will be referred herein as the boundary routing server. Processing then continues to block 604.

At block 604, a session mapping is stored, wherein the session mapping may be between at least any two or more of at least a portion of a sender phone number included within the originally received MM, the session information, a unique identifier associated with the MM, the source routing server, and the application interface. In one embodiment, the unique identifier may be a long code (e.g., a short code and an extension). In one embodiment, the received session information may include an identifier of the source routing server, and application identifier and/or type for an application sending and/or expecting a response for the MM, an identifier of the application interface, or the like. In one embodiment, the received session information may include the extension and/or the sender phone number may be or include the short code. In one embodiment, the session mapping may be stored at boundary routing server determined to process the originally received MM. In one embodiment, the session mapping may include the identifier of the boundary and/or source routing server, at least a portion of a sender phone number of the original MM, at least a portion of the destination phone number of the original MM, an application identifier associated with the application interface, the unique identifier, or the like. In one embodiment, the MM may be modified to include the unique identifier. For example, the sender phone number of the MM may be modified to be the short code and/or extension. Processing continues to block 606.

At block 606, a response MM in response to the originally received MM is received. In one embodiment, the receiving may be performed at the boundary routing server. In one embodiment, the response MM is received at a local gateway, an MSC, or the like associated with the boundary routing server storing the session mapping, or the like. In one embodiment, the response MM is addressed to the sender phone number of the originally received MM. In one embodiment, the sender phone number comprises a short-code and an extension, or the like. In one embodiment, the response MM is addressed to and/or includes the unique identifier (e.g., long code) of the originally received MM. Processing then continues to block 608.

At block 608, the session mapping is retrieved based on the response MM. In one embodiment, the retrieval may be performed at the boundary routing server. In one embodiment, the retrieval may be based on a match of at least a portion of the MM and a key/identifier for the session mapping, another sender phone number of the response MM with the at least a portion of the destination phone number of the originally received MM, a match of at least a portion of another destination phone number of the response MM with the at least the portion of the sender phone number of the originally received MM, or the like. In one embodiment, the session mapping may be identified/keyed by the unique identifier (e.g., long code). The long code may be the receiver address of the response MM and/or included within the response MM. Retrieval may be based on matching the unique identifier and the long code associated with the response MM. The retrieval may be based on a lookup table, database query, or the like. Processing then continues to block 609.

At block 610, the response MM is forwarded to a mapped routing server based on the session mapping. In one embodiment, the mapped routing server is the source routing server receiving the original MM. In one embodiment, the mapped routing server is configured to send the response MM to the application interface based on the session mapping/session information (e.g., based on the application identifier or application type stored in the retrieved session mapping and/or session information). In one embodiment the mapped routing server may be the routing server stored in the session mapping. Processing continues to block 612.

At block 612, the application interface may process the forwarded response MM. In one embodiment, the application interface may transcode the MM to an application type (e.g., an email, web page, or the like). The transcoded version of the MM may be sent to an application associated with the application type and/or application interface. Processing then returns to calling process for further processing.

It will be understood that each block of a flowchart illustration need not be limited in the ordering shown in the illustration, and might be performed in any ordering, or even performed concurrently, without departing from the spirit of the invention. It will also be understood that each block of the flowchart illustration, and combinations of blocks in the flowchart illustration, can be implemented by computer program instructions. These program instructions might be provided to a processor to produce a machine, such that the instructions, which execute on the processor, create means for implementing the actions specified in the flowchart block or blocks. The computer program instructions might be executed by a processor to cause a series of operational steps to be performed by the processor to produce a computer implemented process such that the instructions, which execute on the processor to provide steps for implementing the actions specified in the flowchart block or blocks.

Accordingly, blocks of the flowchart illustration support combinations of means for performing the specified actions, combinations of steps for performing the specified actions and program instruction means for performing the specified actions. It will also be understood that each block of the flowchart illustration, and combinations of blocks in the flowchart illustration, can be implemented by special purpose hardware-based systems which perform the specified actions or steps, or combinations of special purpose hardware and computer instructions.

The above specification, examples, and data provide a complete description of the manufacture and use of the composition of the invention. Since many embodiments of the invention can be made without departing from the spirit and scope of the invention, the invention resides in the claims hereinafter.

What is claimed as new and desired to be protected by Letters Patent of the United States is:

1. A system for communicating information over a network, comprising:
   a plurality of application interfaces configured to be communicated over the network;
   a routing server located in a geographic region, wherein the routing server is in communication with the plurality of application interfaces, and wherein the routing server is configured to perform operations comprising:
   receiving a mobile message (MM) at the routing server, prior to receiving the MM at a Message Service Center (MSC), from at least one of the plurality of application interfaces, wherein the MM comprises a destination phone number;
   determining at the routing server whether the MM is to be locally processed by a MSC within the geographic region or remotely processed by a MSC in another geographic region by analyzing the destination phone number to determine a geographic location associated with the destination phone number;
   if the MM is determined to be locally processed by a MSC in the geographic region, determining to route the MM to a local aggregator or to a MSC; and
   if the MM is determined to be remotely processed by a MSC in another geographic region, recursively forwarding the MM to another routing server located within the other geographic region associated with the destination phone number;
   the local aggregator in communication with the routing server, wherein the local aggregator is configured to forward the MM to a plurality of carriers;
   the MSC in communication with the routing server, wherein the MSC is configured to send the MM to a destination carrier, wherein the destination carrier is configured to send a version of the MM to a mobile device for display on the mobile device; and
   the other routing server in communication with the routing server, wherein the other routing server is configured to perform operations comprising:

storing a session mapping between at least a portion of a sender phone number, at least a portion of the destination phone number, and at least one of a plurality of application interfaces, wherein the sender phone number comprises a short-code and an extension;
selectively routing the MM to another local aggregator or another MSC;
receiving, from the MSC, another MM addressed to the short-code;
retrieving the session mapping based on a match of at least a portion of another sender phone number of the other MM with the at least a portion of the destination phone number, and a match of at least a portion of another destination phone number of the other MM with the at least the portion of the sender phone number; and
forwarding the other MM to the at least one of the plurality of application interfaces based on the session mapping.

2. The system of claim 1, wherein selectively routing further comprises:
determining the destination carrier based on a Subscriber Number (SN) portion of the destination phone number.

* * * * *